(12) United States Patent
Silvery et al.

(10) Patent No.: US 12,107,460 B2
(45) Date of Patent: Oct. 1, 2024

(54) ELECTRIC MACHINE

(71) Applicant: Schaeffler Technologies AG & Co. KG, Herzogenaurach (DE)

(72) Inventors: Christian Silvery, Walzbachtal (DE); Mike Czerlewitz, Bühl (DE); Matthias Kästle, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 325 days.

(21) Appl. No.: 17/606,169

(22) PCT Filed: Mar. 26, 2020

(86) PCT No.: PCT/DE2020/100244
§ 371 (c)(1),
(2) Date: Oct. 25, 2021

(87) PCT Pub. No.: WO2020/216402
PCT Pub. Date: Oct. 29, 2020

(65) Prior Publication Data
US 2022/0200412 A1  Jun. 23, 2022

(30) Foreign Application Priority Data

Apr. 26, 2019 (DE) .................. 10 2019 110 858.6
Aug. 6, 2019 (DE) .................. 10 2019 121 189.1

(51) Int. Cl.
*H02K 11/25* (2016.01)
*H02K 3/12* (2006.01)
*H02K 5/22* (2006.01)

(52) U.S. Cl.
CPC ............ *H02K 11/25* (2016.01); *H02K 3/12* (2013.01); *H02K 5/225* (2013.01); *H02K 2203/09* (2013.01)

(58) Field of Classification Search
CPC .................. H02K 3/12; H02K 5/225
See application file for complete search history.

(56) References Cited

U.S. PATENT DOCUMENTS

2017/0019000 A1   1/2017   Sakamoto et al.

FOREIGN PATENT DOCUMENTS

| CN | 107532946 A | 1/2018 | |
|---|---|---|---|
| DE | 102013201834 A1 | 8/2014 | |
| EP | 3401658 A1 * | 11/2018 | ........... G01K 1/14 |
| FR | 3069116 A1 * | 1/2019 | ........... H02K 11/25 |

(Continued)

OTHER PUBLICATIONS

FR-3069116-A1_translate (Year: 2019).*

(Continued)

*Primary Examiner* — Tulsidas C Patel
*Assistant Examiner* — Mohammed Ahmed Qureshi
(74) *Attorney, Agent, or Firm* — Volpe Koenig

(57) ABSTRACT

An electric machine includes a stator having a winding, and at least one temperature sensor arrangement having a temperature sensor for detecting the temperature in the region of the winding. The ends of at least one part of the conductor protrude from the winding. One part of said ends is connected to an axial or radial interconnection ring placed on the winding. The temperature sensor arrangement is arranged on a conductor and the temperature sensor is thermally coupled to at least one conductor.

11 Claims, 5 Drawing Sheets

(56) References Cited

FOREIGN PATENT DOCUMENTS

| | | | |
|---|---|---|---|
| JP | 09159538 A | * | 6/1997 |
| JP | 2008131775 A | | 6/2008 |
| JP | 2015053814 A | * | 3/2015 |

OTHER PUBLICATIONS

EP-3401658-A1_translate (Year: 2018).*
JP-2015053814-A_translate (Year: 2015).*
JP-09159538-A_translate (Year: 1997).*

* cited by examiner

ELECTRIC MACHINE

CROSS-REFERENCE TO RELATED APPLICATIONS

This application is the U.S. National Phase of PCT Appln. No. PCT/DE2020/100244 filed Mar. 26, 2020, which claims priority to DE 102019110858.6 filed Apr. 26, 2019 and DE 102019121189.1 filed Aug. 6, 2019, the entire disclosures of which are incorporated by reference herein.

TECHNICAL FIELD

The disclosure relates to an electric machine comprising a stator with a winding, as well as at least one temperature sensor arrangement comprising a temperature sensor for detecting the temperature in the region of the winding.

BACKGROUND

Electric machines comprise a rotor and a stator and are used in various areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a plurality of conductors, wherein the conductors are assigned to one or usually more than one phase. The winding is guided around the stator teeth in a manner known per se.

Not only the number of phases is included in the design of the winding geometry, but also the number of wires per phase as well as the number of wires per slot within the stator toothing and the number of pole pairs. This plurality of conductors and winding parameters creates a complex network of conductors that is built up using various winding technologies. Examples include hairpin or bar wave windings. Here, the conductors are formed by means of rods bent into a U-shape, which are put together to form a winding basket. The conductors are laid on a plurality of radial levels, with the conductors moving from level to level, so to speak. To form these, so to say, meandering, circumferential conductors, they are to be connected accordingly at the ends thereof, which is usually done by welding the conductor ends that are adjacent to one another. The conductor ends converge at one point or on one winding side in the form of the so-called star, where they are connected to one another. In this region, the connection is to be made of the individual phases to an external power supply, i.e., a power connection that is used to generate the magnetic field.

During the operation of the electric machine, the temperature of individual components must be monitored, for which purpose corresponding temperature sensors, e.g., PTC or NTC sensors, are used. One region in which the temperature is to be recorded is that of the winding, since one of the hottest points of the stator of the electric machine prevails in the region of the winding where a temperature sensor can be installed. That is because the hottest point of the stator is in the hairpin or bar wave winding region, precisely in the axial center of the laminated core. However, since this point cannot be reached to integrate a temperature sensor, the outer region of the winding is selected. For this purpose, the temperature sensor is installed inside the stator, which means that it usually must be installed at an early stage of the production process. To record the temperature in the winding region as precisely as possible, it is desirable to attach the temperature sensor as close as possible to or on the winding or winding head, since media flowing in the interior, for example water, air, oil, etc., can affect the temperature measurement and therefore the measurement becomes inaccurate with increasing distance of the temperature sensor from the winding or the winding head. The arrangement of the temperature sensor, in particular on a particularly tightly wound or compactly wound winding, such as a hairpin or a bar wave winding, is particularly complicated.

SUMMARY

The disclosure is based on the problem of specifying an electric machine that is improved in comparison.

To solve this problem, in an electric machine of the type mentioned, the disclosure provides that the ends of at least some of the conductors protrude beyond the winding, wherein some of these ends are connected to an interconnection ring placed axially or radially on the winding, wherein the temperature sensor arrangement is arranged on a conductor and the temperature sensor is thermally coupled to the conductor.

In the electric machine according to the disclosure, the temperature sensor arrangement is arranged independently of a connection ring on a conductor, in the usual form of a conductor rail or a busbar, either between the connection ring and line electronics or on a so-called special wire. This is a conductor that is not designed like all common hairpins, geometrically and in terms of position. The temperature sensor can be designed, for example, as a PTC or an NTC measuring sensor, which is in thermal contact with the conductor. This enables direct temperature detection on such a conductor or conductor rail through which current flows during operation and which therefore heats up, and thus in the immediate winding region, wherein the radial and axial position of the temperature sensor arrangement and thus the temperature sensor itself are made reliable and given reproducible accuracy by fixing the temperature sensor arrangement on the conductor itself. By integrating the temperature detection directly on this conductor, usually a copper conductor or a copper bar, an optimal heat transfer is achieved so that undesired error influences and measured value deviations are reliably avoided. In addition, it is possible in the manner according to the disclosure not only to measure the temperature in a radially or axially outer edge region of the stator winding, which is subjected to a different operating temperature than a current conductor, on which the measurement is now made directly according to the disclosure due to the increased heat dissipation.

The temperature sensor arrangement itself expediently has a housing in which the temperature sensor is received and through which the conductor extends. The housing, which is placed on the conductor, serves to encapsulate the temperature sensor on the one hand, but also the measuring point on the other, allowing for very good protection against external influences that have a detrimental effect on the measurement, such as media flows of water, oil, air, etc., which can advantageously be avoided, and a very exact measurement.

The housing itself expediently has a carrier on which the temperature sensor is fixed, as well as a cover which can be releasably attached to the carrier and which closes the housing. The housing is therefore in two parts so that it can easily be placed on the conductor that extends through the housing or can be placed around the conductor. The cover is expediently attached to the carrier via a latching or clamping connection, which enables a very simple connection or simple closing of the housing. In addition to simple assembly, the latching or clamping connection also enables very simple dismantling in the case of maintenance or repair work, that is to say that the temperature sensor arrangement can easily be replaced when necessary.

The temperature sensor itself is preferably arranged on a sensor carrier which has a form-fit contour or onto which a shrink tube having a form-fit contour is drawn, a counter-contour receiving the form-fit contour being provided on the carrier. This corresponding contouring of the sensor carrier or shrink tube and carrier enables a reproducible, precisely positioned arrangement of the sensor carrier or the temperature sensor on the carrier, which also simplifies assembly.

According to a particularly advantageous development of the disclosure, a spring element is provided for spring loading the temperature sensor against the conductor. This spring element ensures that the temperature sensor is always brought into a defined thermal coupling to the conductor, and any geometric tolerances can easily be compensated for. This means that the temperature sensor or the sensor carrier on the carrier is slightly movable so that it can be pressed against the spring element.

In this case, the spring element is preferably arranged on the cover and, when the cover is installed, positioned laterally adjacent to the sensor carrier, on the opposite side of which the conductor runs. This means that when the cover is closed or attached, the spring element presses against the sensor carrier or the shrink tube enclosing same, so that this arrangement with the temperature sensor is pressed against the conductor. As described, the sensor carrier is arranged on the carrier in a slightly movable manner so that the spring element is spring loaded against the conductor, even while compensating for any small tolerances.

A curved leaf spring is preferably used as the spring element, which is fastened to the cover in a suitable manner by means of appropriate fastening means such as latching or clamping sections.

The housing of the temperature sensor arrangement itself is preferably made of plastic, so it can be manufactured inexpensively in a very simple manner.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
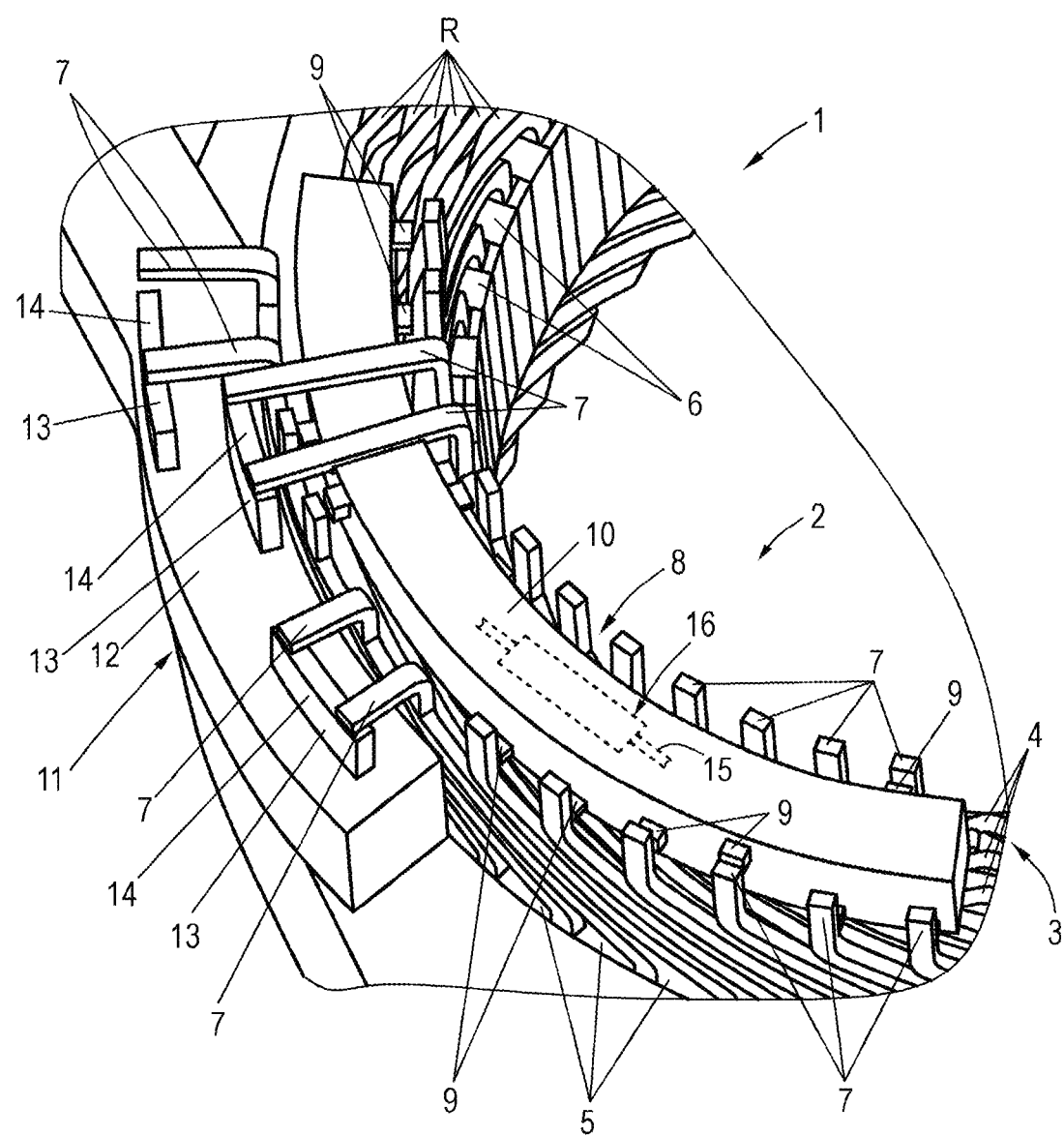
FIG. 1 shows a schematic diagram in the form of a partial view of an electric machine according to the disclosure.

FIG. 1 shows, in the form of a partial view, a schematic illustration of an electric machine 1 according to the disclosure comprising a stator 2, a winding 3 comprising a plurality of conductors 4, which are assigned to three separate phases in the example shown. Each conductor 4 is designed as a U-shaped bracket, so to speak, wherein a plurality of such U-shaped conductors 4, often also called hairpins, are plugged together to form the winding 3, which can also be referred to as a winding basket. The plurality of conductors 4 define different radial planes R, as shown in FIG. 1. For this purpose, the conductors 4 extend, depending on the winding diagram, from one radial plane to another radial plane, for example an adjacent radial plane, in the region in which they are connected to the conductor ends of corresponding adjacent conductors 4 continuing the phase conductor.

The conductors 4 are guided or bent and laid in such a way that corresponding recesses 5 result, which extend radially so that corresponding stator teeth 6 engage in these recesses 5 or the corresponding conductors 4 are wound between the corresponding grooves of the stator teeth 6. The basic structure of such a stator 2 or a winding 3 wound from the separate brackets described is basically known.

In the stator 2 according to the disclosure, the ends 7 of the conductors 4, insofar as the ends 7 terminate respectively at the inner circumference and the outer circumference of the annular winding 3, are axially protruding, i.e., they protrude axially from the winding 3. These ends 7 are associated with individual conductors 4, which in turn are assigned to different phases, which is why the conductor ends must be connected according to the routing diagram of the conductor 4. For this purpose, an interconnection ring 8 is used, which in the example shown is placed axially on the end face of the winding 3 and is arranged between the conductor ends 7 or engages therebetween. As will be discussed below, the interconnection ring 8 comprises a plurality of corresponding conductors, which can also be referred to as conducting bridges and are formed from conductor rails or busbars, usually of copper, as well as on connection sections 9 which protrude to the side from the housing 10 of the interconnection ring 8 and after insertion of the interconnection ring 8 the connection sections 9 are positioned in a positionally exact manner adjacent to the corresponding conductor end 7 with which they are to be connected. The connection is made by simple welding so that all conductors 4 are correctly and phase-specifically interconnected when they are connected. Furthermore, a power supply 11 is provided, which is arranged radially next to the winding 3 in the region of the axial end thereof. This power supply 11, also referred to as an HV terminal, comprises a housing 12, in which corresponding conductor rails 13 are arranged, which protrude with the connection terminals 14 thereof from the housing 12.

In the present case is shown, as described, a 3-phase stator, which is why three such connection terminals 14 are also provided in the example shown.

Each connection terminal 14 is to be connected to one phase of the winding 3. This is implemented in a simple manner in the exemplary embodiment shown in that two conductor ends 7a per phase are guided or bent radially outwards, as FIG. 1 illustrates.

As described, a plurality of corresponding conductors, which form conducting bridges, are provided in the interior of the housing 10 of the interconnection ring 8, only one such conductor 15 being shown in dashed lines in the exemplary embodiment shown. A temperature sensor arrangement 16 is arranged on this conductor, that is to say directly connected to the conductor 15, to directly measure the conductor temperature as a measure of the winding temperature.

Figure 2:
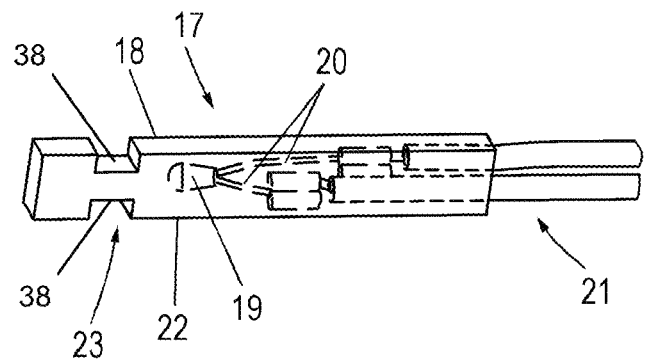
FIG. 2 shows a perspective view of a temperature sensor device comprising the sensor carrier and temperature sensor.

The temperature sensor arrangement 16 comprises a temperature sensor device 17, as shown in FIG. 2. The temperature sensor device 17 has a sensor carrier 18 on which are arranged a temperature sensor 19 and corresponding connecting lines 20 to a continuing cable 21. A shrink tube 22 is drawn onto the sensor carrier 18, which has a defined form-fit contour 23 having two suitable undercuts 38 in the front end, which are used to mount and position the sensor device 18 on a carrier 24.

Figure 3:
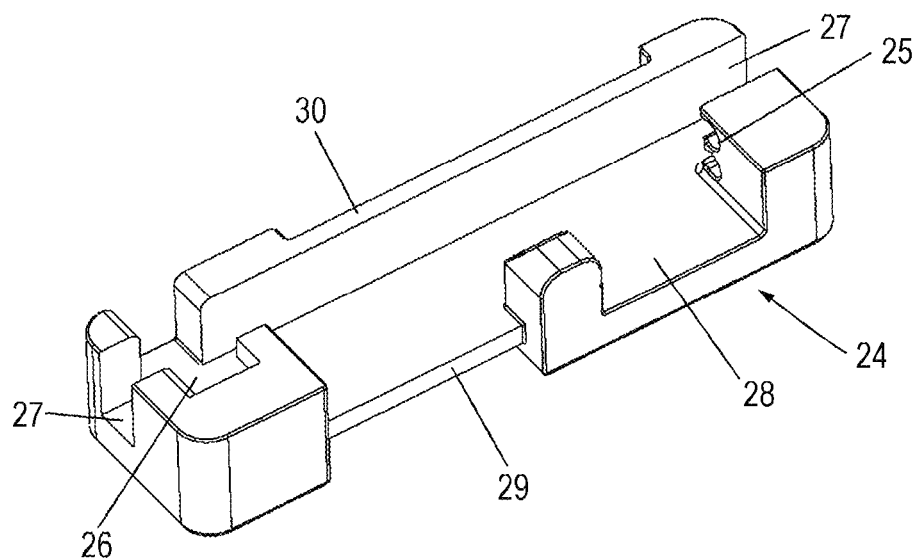
FIG. 3 shows a perspective view of a carrier as part of the temperature sensor arrangement.

Such a carrier 24 is shown in FIG. 3 as a perspective view. The carrier 24 is made of plastic and has a cable holding section 25 and an engagement contour section 26 for the form-fit contour 23. In addition, as will be discussed below, two axially aligned openings 27 are provided through which the conductor 15 runs into and out of the housing to be formed by means of the carrier 24 and a cover to be described below. Further lateral openings 28, 29 are also closed by means of the cover, which will be discussed below.

Figure 4:
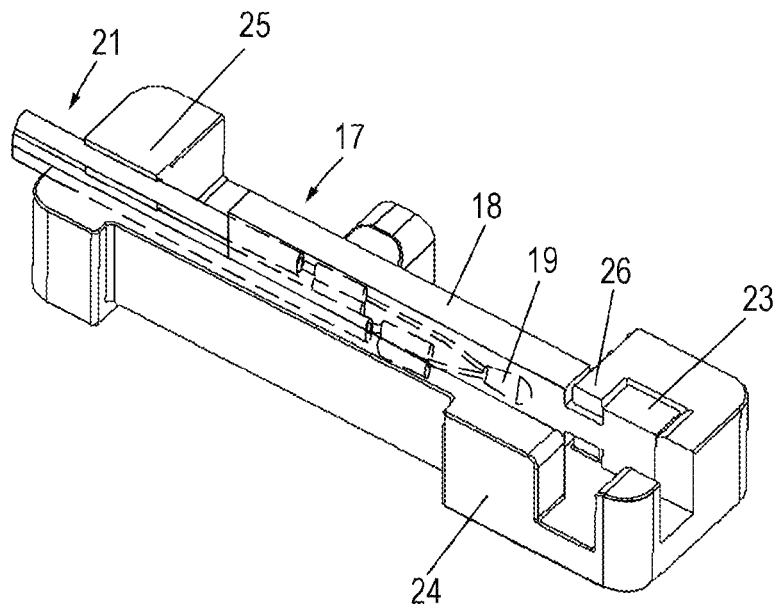
FIG. 4 shows the mounted temperature sensor device on the carrier.

FIG. 4 shows an arrangement in which the temperature sensor device 17 is attached to the carrier 24. As can be seen, the cable 21 runs through the cable holding section 25, while the form-fitting contour 23 engages in the engagement contour section 26. The arrangement is such that the sensor carrier 18 is vertical, so to speak, so that the temperature sensor 19 is directed towards the interior of the carrier 24.

Figure 5:
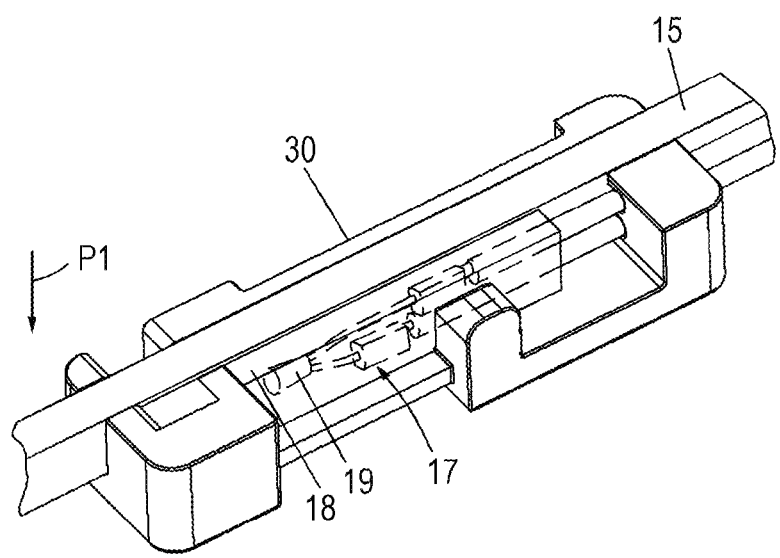
FIG. 5 shows the temperature sensor arrangement, attached to the conductor for which a temperature is to be detected.

This arrangement is now coupled to the conductor 15, that is to say the conductor rail 15. This is inserted into the open carrier from above, see arrow P1 in FIG. 5, so that it is arranged between the outer carrier wall 30 and the temperature sensor device 17 or the sensor carrier 18. The temperature sensor 19 is accordingly positioned directly adjacent to the flat, rail-shaped conductor 15.

Figure 6:
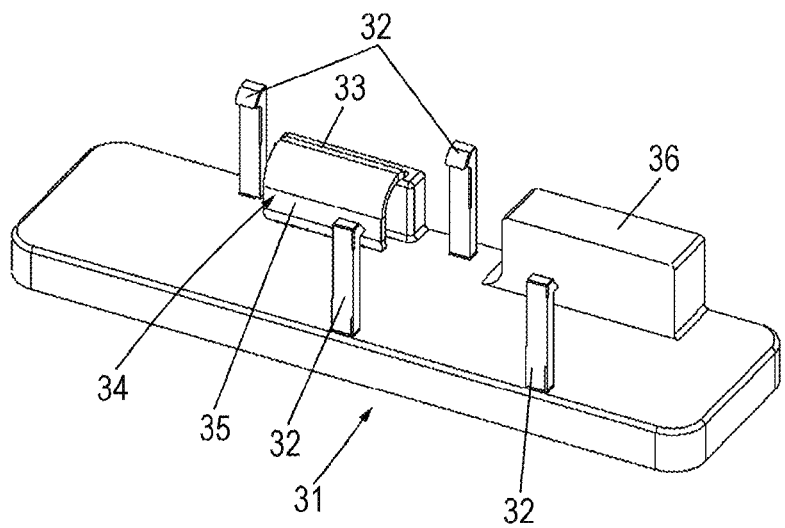
FIG. 6 shows a perspective view of a cover for attachment to the carrier.

A cover 31, which is shown in detail in FIG. 6, is then put on to form a closed housing. The cover 31 has a plurality of latching elements 32 by means of which it is latched onto the carrier 24. A wall section 33 is also provided, on which a spring element 34 is arranged here in the form of a leaf spring 35, which is directed towards the center of the cover. This leaf spring 35 serves to spring the temperature sensor device 17 or the sensor carrier 18 and thus the temperature sensor 19 against the conductor 15, which will be discussed below. Furthermore, a wall section 36 is provided, which is arranged to be adjacent to the wall section 33.

Figure 7:
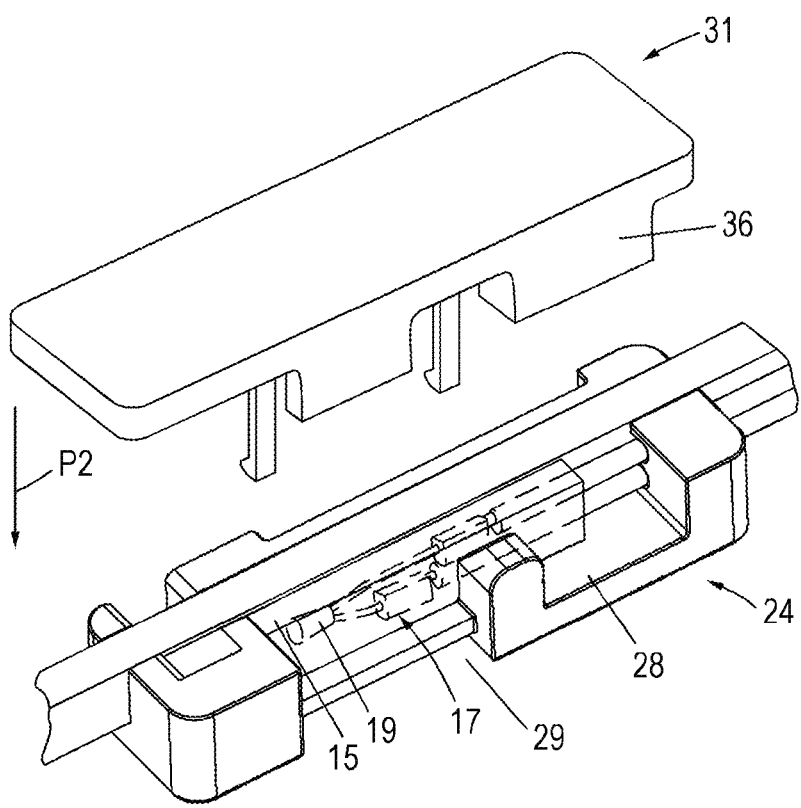
FIG. 7 shows the temperature sensor arrangement according to the disclosure in the open state with the carrier arranged on the conductor and the cover detached.
Figure 8:
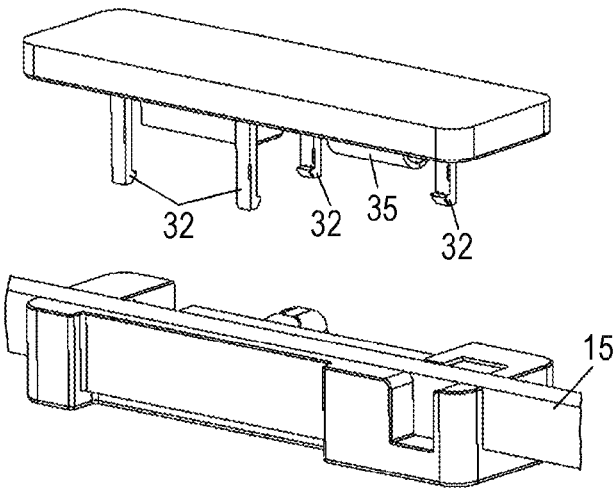
FIG. 8 shows the arrangement from FIG. 7 from the other side.

As FIG. 7 shows, the cover 31 is now placed on the carrier 24, as shown by the arrow P2. Here, the wall section 36 engages in the opening 28, while the wall section 33 engages in the opening 29. As FIGS. 7 and 8 show, the leaf spring 35 comes to lie directly adjacent to the temperature sensor device 17, so that it is spring loaded against the conductor 15, and thus the temperature sensor 19. The fixation takes place via the snap-in latching elements 32.

Figure 9:
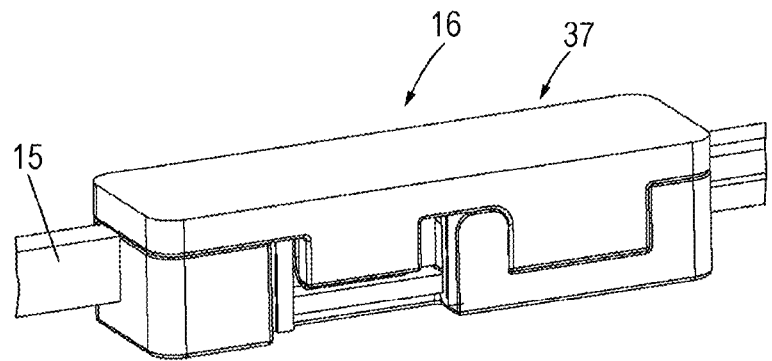
FIG. 9 shows the closed temperature sensor arrangement.

As FIG. 9 shows, this results in a closed housing 37, wherein FIG. 9 shows the fully assembled temperature sensor arrangement 16. The housing 37 is almost completely closed so that any disruptive influences cannot reach the actual measuring range.

Figure 10:
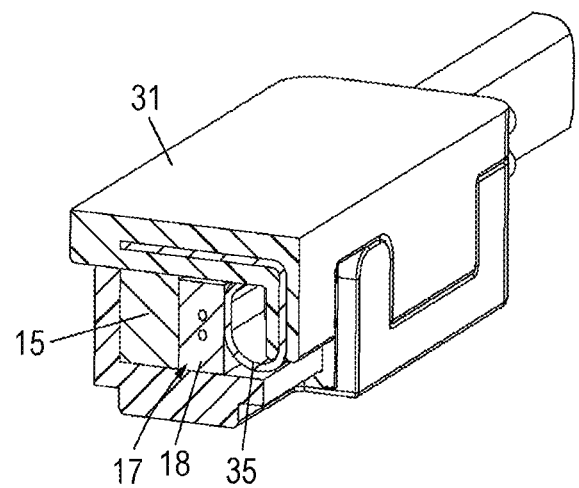
FIG. 10 shows a sectional view through the temperature sensor arrangement with a continuous conductor according to FIG. 9.

As the sectional view according to FIG. 10 clearly shows, the temperature sensor device 17, or the sensor carrier 18 and thus also the temperature sensor 19, are firmly pressed against the conductor 15 via the leaf spring 35, which as shown in FIG. 10, can be cast on the cover 31 to enable an optimal thermal coupling for an exact measurement. In addition, the closed housing 37 also provides ideal protection.

As simple as the assembly is, in the context of which only the temperature sensor device 17 must be attached to the carrier 24, after which this arrangement must be fixed to the conductor 15 and now only the cover 31 must be clipped on, the dismantling is thus also simple in the event of maintenance.

LIST OF REFERENCE NUMBERS

1 Electric machine
2 Stator
3 Winding
4 Conductor
5 Recess
6 Stator tooth
7 End
8 Interconnection ring
9 Connection section
10 Housing
11 Power supply
12 Housing
13 Conductor rail
14 Connection terminal
15 Conductor
16 Temperature sensor arrangement
17 Temperature sensor device
18 Sensor carrier
19 Temperature sensor
20 Connecting cable
21 Cable
22 Heat shrink tubing
23 Form-fitting contour
24 Carrier
25 Cable holding section
26 Engagement contour section
27 Opening
28 Opening
29 Opening
30 Support wall
31 Cover
32 Detent element
33 Wall section
34 Spring element
35 Leaf spring
36 Wall section
37 Housing
R Radial plane
P1 Arrow
P2 Arrow

The invention claimed is:
1. An electric machine comprising:
a stator having a winding comprising a first conductor; and
at least one temperature sensor arrangement comprising a temperature sensor device for detecting a temperature in a region of the winding, wherein:
ends of at least one part of the first conductor protrude beyond the winding,
one part of said ends is connected to an axial or radial interconnection ring placed on the winding, and the interconnection ring comprises a second conductor and the temperature sensor arrangement is arranged on the second conductor and the temperature sensor device is thermally coupled to the second conductor;

the temperature sensor device comprises a sensor carrier within which a temperature sensor is fixed, the sensor carrier includes a form-fit contour configured to couple to a mating engagement contour of a carrier, such that when coupled the sensor carrier is fixed relative to the carrier, wherein the form-fit contour of the sensor carrier includes at least one cutout formed within a first end of the sensor carrier.

2. The electric machine according to claim 1, wherein the temperature sensor arrangement has a housing in which the temperature sensor device is received and through which the second conductor extends.

3. The electric machine according to claim 2, wherein the housing includes the carrier on which the temperature sensor device is fixed, as well as a cover configured to be detachably fastened to the carrier and close the housing.

4. The electric machine according to claim 3, wherein the cover is fastened to the carrier via a latching or clamping connection.

5. The electric machine according to claim 3, wherein a spring element is provided for spring loading the temperature sensor against the second conductor.

6. The electric machine according to claim 5, wherein the spring element is arranged on the cover and, with the cover installed, is positioned to be laterally adjacent to the sensor carrier, on the opposite side of which the second conductor runs.

7. The electric machine according to claim 5, wherein the spring element is a curved leaf spring.

8. The electric machine according to claim 2, wherein the housing is made from plastic.

9. An electric machine comprising:
a stator having a winding comprising a plurality of conductors;
an interconnection ring disposed on an end face of the winding and arranged between conductor ends of the plurality of conductors, the interconnection ring comprising at least one conducting bridge, wherein the conductor ends of the plurality of conductors protrude beyond the winding and are connected to the interconnection ring; and
at least one temperature sensor arrangement arranged on the conducting bridge and including a temperature sensor for measuring a temperature of the winding, wherein the temperature sensor is thermally coupled to the conducting bridge
the interconnection ring includes:
a housing in which the conducting bridge is received and through which the conducting bridge extends therethrough;
a sensor carrier on which the temperature sensor is fixed; and
a cover detachably fastened to a carrier supporting the sensor carrier that closes the housing, wherein a spring element is arranged on the cover and positioned laterally adjacent to the sensor carrier, the spring element configured for spring loading the temperature sensor against the conducting bridge, wherein the cover is fastened to the carrier by latching a plurality of latching elements of the cover to the carrier.

10. The electric machine according to claim 1, wherein the form-fit contour of the sensor carrier includes two cutouts formed within the first end of the sensor carrier.

11. The electric machine according to claim 1, wherein the sensor carrier is a shrink tube.

* * * * *